United States Patent
Yaeo

(10) Patent No.: US 10,168,250 B2
(45) Date of Patent: Jan. 1, 2019

(54) ABNORMALITY DIAGNOSIS DEVICE AND ABNORMALITY DIAGNOSIS METHOD FOR INTAKE SYSTEM OF INTERNAL COMBUSTION ENGINE

(71) Applicant: TOYOTA JIDOSHA KABUSHIKI KAISHA, Toyota-shi, Aichi-ken (JP)

(72) Inventor: Toru Yaeo, Anjo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 94 days.

(21) Appl. No.: 15/590,097

(22) Filed: May 9, 2017

(65) Prior Publication Data

US 2017/0328810 A1 Nov. 16, 2017

(30) Foreign Application Priority Data

May 12, 2016 (JP) .................................. 2016-096242

(51) Int. Cl.
| | |
|---|---|
| G01M 15/02 | (2006.01) |
| F02M 35/10 | (2006.01) |
| G01M 15/00 | (2006.01) |
| G01M 15/09 | (2006.01) |

(52) U.S. Cl.
CPC ...... *G01M 15/02* (2013.01); *F02M 35/10163* (2013.01); *G01M 15/00* (2013.01); *G01M 15/09* (2013.01); *Y02T 10/144* (2013.01)

(58) Field of Classification Search
CPC ...... G01M 15/02; G01M 15/00; G01M 15/09; F02M 35/10163; Y02T 10/144
See application file for complete search history.

(56) References Cited

U.S. PATENT DOCUMENTS

| | | | |
|---|---|---|---|
| 8,353,198 B2* | 1/2013 | Burkhardt | F02B 37/18 73/114.37 |
| 8,463,490 B2* | 6/2013 | Burkhardt | F02B 37/16 701/33.9 |
| 8,731,850 B2* | 5/2014 | Ungermann | F02D 41/0002 702/113 |
| 9,945,745 B2* | 4/2018 | Nakano | F02D 41/22 |
| 2011/0282598 A1 | 11/2011 | Ungermann et al. | |

FOREIGN PATENT DOCUMENTS

| | | |
|---|---|---|
| JP | 2004-100494 A | 4/2004 |
| JP | 2006-194160 A | 7/2006 |
| JP | 2009-024630 A | 2/2009 |
| JP | 2010-261354 A | 11/2010 |

* cited by examiner

Primary Examiner — Freddie Kirkland, III
(74) Attorney, Agent, or Firm — Oliff PLC

(57) ABSTRACT

An electronic control unit diagnoses leakage abnormality in an intake system downstream from a supercharger provided in the intake system of the engine. The electronic control unit sets, as a supercharging region monitoring value, a ratio between a first air amount obtained from a detection value of an air flowmeter and a second air amount obtained from a detection value of an intake pressure sensor, the ratio being the ratio obtained when the engine is operated in a supercharging region. The electronic control unit also sets, as a non-supercharging region monitoring value, a ratio obtained when the engine is driven in a non-supercharging region. The electronic control unit determines the presence of the leakage abnormality in the intake system when the ratio of the supercharging region monitoring value to the non-supercharging region monitoring value is larger than a predetermined specified value.

5 Claims, 8 Drawing Sheets

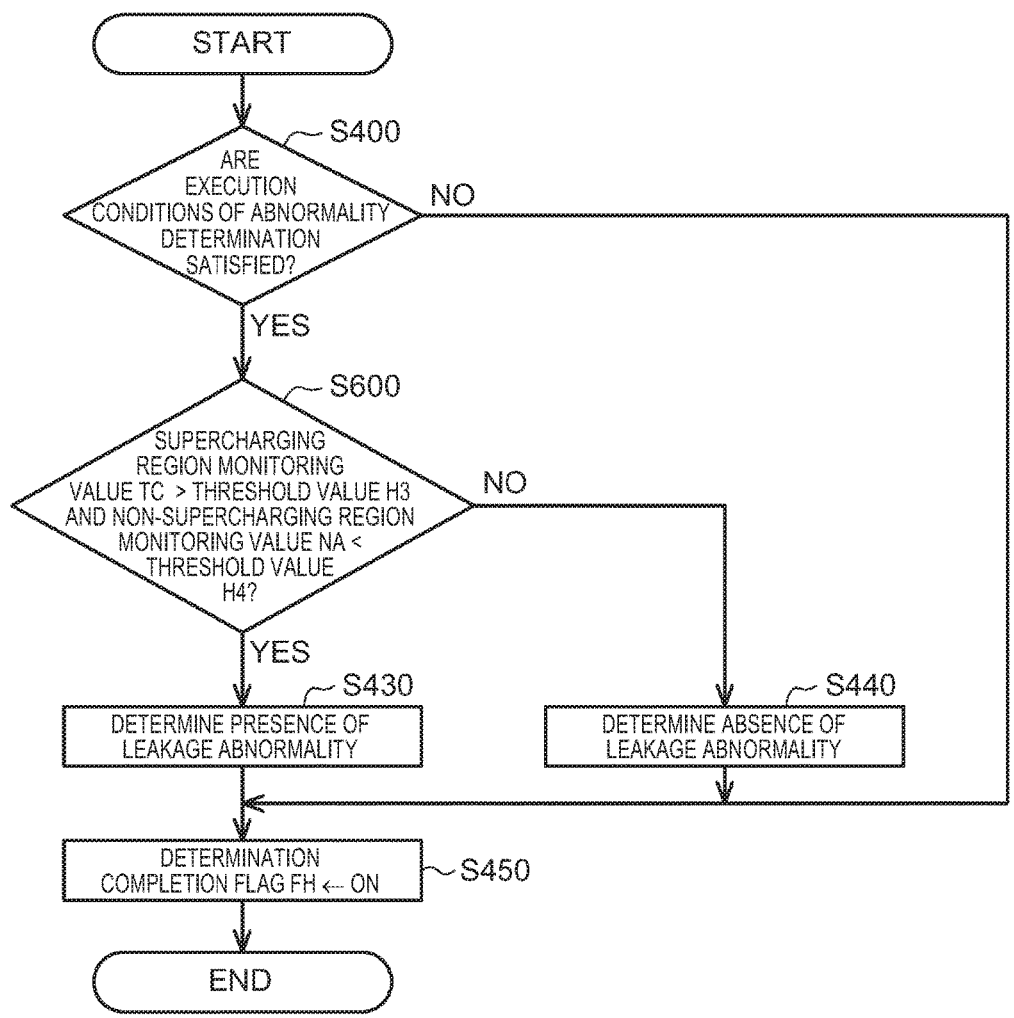

ABNORMALITY DIAGNOSIS DEVICE AND ABNORMALITY DIAGNOSIS METHOD FOR INTAKE SYSTEM OF INTERNAL COMBUSTION ENGINE

INCORPORATION BY REFERENCE

The disclosure of Japanese Patent Application No. 2016-096242 filed on May 12, 2016 including the specification, drawings and abstract is incorporated herein by reference in its entirety.

BACKGROUND

1. Technical Field

The technical field relates to an abnormality diagnosis device and an abnormality diagnosis method for an intake system of an internal combustion engine.

2. Description of Related Art

Generally, in an internal combustion engine, the intake air sucked into a combustion chamber through an intake system and a fuel injected from a fuel injection valve such that the amount of the fuel corresponds to the amount of intake air are mixed with each other to provide an air-fuel mixture that is combusted in a combustion chamber to obtain an output.

The amount of air sucked into the combustion chamber is measured with a sensor provided in the intake system. When a pipeline that constitutes the intake system is disconnected or has a hole, air is undesirably sucked or leaked in the middle of the intake system. This so-called leakage abnormality causes deviation between the amount of air measured with the sensor and the amount of air actually sucked into the combustion chamber.

To diagnose the presence or absence of such leakage abnormality of the intake system, various devices have been proposed. For example, Japanese Patent Application Publication No. 2004-100494 discloses a device configured to compare a detection value of a sensor that detects the air amount (intake pressure) with a reference value in a normal condition free from the air leakage abnormality, and to determine the presence of air leakage abnormality on condition that a difference between the detection value of the sensor and the reference value is equal to or more than a certain level.

SUMMARY

In the case where a slight gap or a small hole is generated in one of the pipelines that constitute the intake system, or a pipeline having a small diameter is disconnected, a quantity of the leaked air is relatively low, and therefore the difference between the detection value of the sensor and the reference value as described above is not very large. Therefore, when the intake system has leakage abnormality that is relatively low in severity, related devices may fail to detect such abnormality, which results in relatively low accuracy in abnormality diagnosis.

It is an object of the present disclosure to provide an abnormality diagnosis device and an abnormality diagnosis method for an intake system of an internal combustion engine capable of more accurately diagnosing leakage abnormality in the intake system.

An abnormality diagnosis device for an intake system of an internal combustion engine according to a first aspect of the present disclosure is applied to an internal combustion engine having an intake system equipped with a supercharger that pumps air to diagnose leakage abnormality in the intake system downstream from the supercharger. The internal combustion engine includes an air flowmeter provided upstream from the supercharger in the intake system, a throttle valve provided downstream from the supercharger in the intake system, and an intake pressure sensor provided downstream from the throttle valve in the intake system. The abnormality diagnosis device for an intake system includes: a first air amount calculation unit that calculates a first air amount that is an intake air amount obtained from a detection value of the air flowmeter; a second air amount calculation unit that calculates a second air amount that is an intake air amount obtained from a detection value of the intake pressure sensor; a ratio calculation unit that calculates a ratio of the first air amount to the second air amount; a supercharging region determination unit that determines whether or not the internal combustion engine is driven in a supercharging region; a first setting unit that sets, as a supercharging region monitoring value, the ratio obtained when the supercharging region determination unit determines that the internal combustion engine is driven in the supercharging region; a second setting unit that sets, as a non-supercharging region monitoring value, the ratio obtained when the supercharging region determination unit determines that the internal combustion engine is driven in a non-supercharging region; and an abnormality determination unit that determines the presence or absence of the leakage abnormality based on a deviation degree between the supercharging region monitoring value and the non-supercharging region monitoring value.

In the abnormality diagnosis device according to the first aspect, the abnormality determination unit may calculate, as a value indicative of the deviation degree, a ratio of the supercharging region monitoring value to the non-supercharging region monitoring value, and determine the presence of the leakage abnormality when the calculated ratio is larger than a preset specified value.

According to the first the aspect, as the deviation degree between the supercharging region monitoring value and the non-supercharging region monitoring value increases, the ratio of the supercharging region monitoring value to the non-supercharging region monitoring value becomes larger. Accordingly, determining the presence of the leakage abnormality when the ratio is larger than a preset specified value makes it possible to appropriately determine the leakage abnormality based on the deviation degree.

In the abnormality diagnosis device according to the first aspect, the abnormality determination unit may calculate, as a value indicative of the deviation degree, a difference between the supercharging region monitoring value and the non-supercharging region monitoring value, and determine the presence of the leakage abnormality when the calculated difference is larger than a preset specified value.

According to the abnormality diagnosis device according to the first aspect, as the deviation degree between the supercharging region monitoring value and the non-supercharging region monitoring value increases, the difference between the supercharging region monitoring value and the non-supercharging region monitoring value becomes larger. Accordingly, determining the presence of the leakage abnormality when the difference is larger than a preset specified value makes it possible to appropriately determine the leakage abnormality based on the deviation degree.

In the abnormality diagnosis device according to the first aspect, the abnormality determination unit may determine the presence of the leakage abnormality when the supercharging region monitoring value is larger than a preset first threshold and the non-supercharging region monitoring value is smaller than a preset second threshold.

In an abnormality diagnosis method according to a second aspect of the present disclosure, the internal combustion engine includes an air flowmeter provided upstream from the supercharger in the intake system, a throttle valve provided downstream from the supercharger in the intake system, and an intake pressure sensor provided downstream from the throttle valve in the intake system. The abnormality diagnosis method including: calculating a first air amount that is an intake air amount obtained from a detection value of the air flowmeter; calculating a second air amount that is an intake air amount obtained from a detection value of the intake pressure sensor; calculating a ratio of the first air amount to the second air amount; setting, as a supercharging region monitoring value, the ratio obtained when the internal combustion engine is driven in the supercharging region; setting, as a non-supercharging region monitoring value, the ratio obtained when the internal combustion engine is driven in the non-supercharging region; and determining the presence or absence of the leakage abnormality based on a deviation degree between the supercharging region monitoring value and the non-supercharging region monitoring value.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 7 is a flowchart illustrating procedures for determining abnormality in another modification of the embodiment.

DETAILED DESCRIPTION OF EMBODIMENTS

Figure 1:
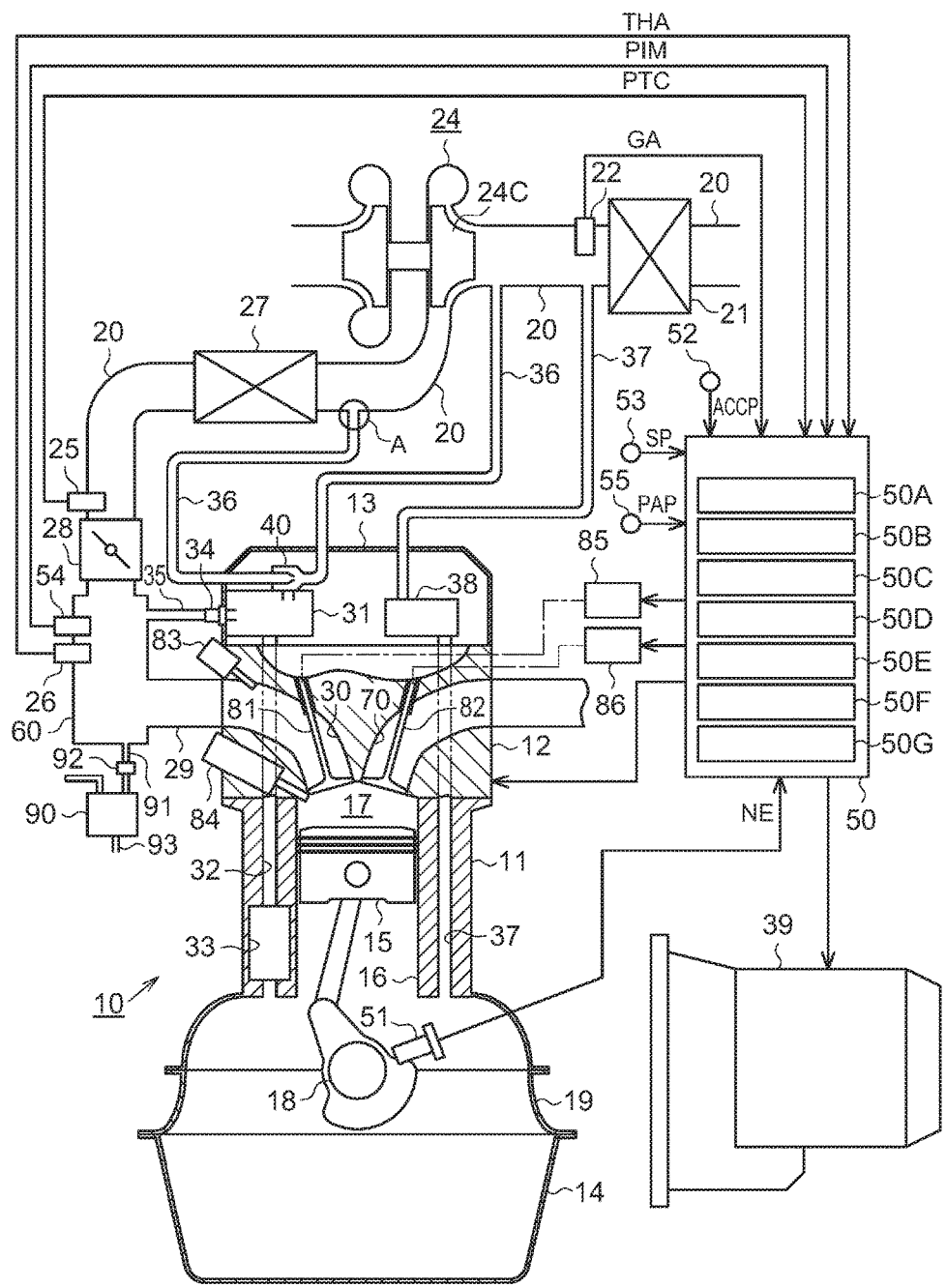
FIG. 1 is an outline diagram schematically illustrating the configuration of one embodiment of an abnormality diagnosis device for an intake system of an internal combustion engine.

Hereinafter, one embodiment that embodies an abnormality diagnosis device for an intake system of an internal combustion engine will be described with reference to FIGS. 1 to 5. As illustrated in FIG. 1, an engine 10 mounted on a vehicle that adopts the abnormality diagnosis device for an intake system of the present embodiment includes a cylinder block 11, a cylinder head 12, a head cover 13, and an oil pan 14. Provided in the cylinder block 11 is a cylinder 16 with a piston 15 reciprocatably disposed therein. A combustion chamber 17 is partitioned and formed with a wall surface of the cylinder 16, a crown surface of the piston 15, and a bottom face of the cylinder head 12.

Provided in the cylinder head 12 are an intake port 30 that introduces intake air into the combustion chamber 17 and an exhaust port 70 that discharges exhaust from the combustion chamber 17. The intake port 30 is equipped with an intake valve 81. The intake valve 81 has a drive system provided with an intake side-variable valve timing mechanism 85 that changes valve timing (opening and closing time) of the intake valve 81. The exhaust port 70 is equipped with an exhaust valve 82. The exhaust valve 82 has a drive system provided with an exhaust side-variable valve timing mechanism 86 that changes valve timing (opening and closing time) of the exhaust valve 82.

The cylinder head 12 is also equipped with a port injection valve 83 that injects fuel into the intake port 30, and a cylinder injection valve 84 that injects fuel directly into the combustion chamber 17. Provided below the cylinder block 11 is a crankcase 19 housing a crankshaft 18 that is an engine output shaft. Provided below the crankcase 19 is the oil pan 14 that stores lubricant oil.

The crankshaft 18 is connected to a multi-stage automatic transmission 39 that switches a transmission gear ratio in stages. An upstream side of the intake port 30 is connected to an intake manifold 29 including a surge tank 60, and an upstream side of the surge tank 60 is connected to an intake passage 20 equipped with various members.

In the intake passage 20, an air cleaner 21, an air flowmeter 22, a compressor 24C of a supercharger 24 driven with the flow momentum of exhaust discharged from the combustion chamber 17, an intercooler 27, a supercharging pressure sensor 25, and a throttle valve 28 are disposed in this order from the upstream side. In the surge tank 60, a temperature sensor 26 and an intake pressure sensor 54 are disposed. The opening of the throttle valve 28 is changed by an electric motor.

The air cleaner 21 filters the intake air taken into the intake passage 20, and the supercharger 24 pumps the air taken into the intake passage 20. The intercooler 27 cools the air that has passed the compressor 24C. The amount of intake air is adjusted as the opening of the throttle valve 28 is adjusted.

Meanwhile, the air flowmeter 22 detects the flow rate of the air flowing through the intake passage 20 (hereinafter referred to as an intake air amount GA). The supercharging pressure sensor 25 detects pressure of the air on the downstream side of the compressor 24C in the intake passage 20 (hereinafter referred to as supercharging pressure PTC). The temperature sensor 26 detects temperature of the air in the surge tank 60 (hereinafter referred to as surge tank internal temperature THS), and the intake pressure sensor 54 detects pressure in the surge tank 60 (hereinafter referred to as intake pressure PIM).

The engine 10 is provided with a purging mechanism that performs so-called a purging process, in which fuel vapor generated in the fuel tank is fed into the combustion chamber 17 and be consumed. The purging mechanism is constituted of a canister 90 that catches the fuel vapor generated in the fuel tank, a purging passage 91 that connects the canister 90 and the surge tank 60, an outside air introduction passage 93 that introduces outside air into the canister 90 during execution of the purging process, and a purge valve 92 that regulates the flow rate of fluid flowing through the purging passage 91. When the pressure in the surge tank 60 is lower than atmospheric pressure while the purge valve 92 is open, the fuel vapor caught by the canister 90 flows into the purging passage 91 together with the outside air and is sucked into the surge tank 60. The fuel vapor sucked into the surge tank 60 is fed through the intake manifold 29 and the intake port 30 together with the intake air and into the combustion chamber 17, where combustion treatment is performed. A purge rate PR, which is a rate of the fuel vapor introduced into the intake air, is variously changed by regulating the opening of the purge valve 92 in accordance with an engine operation state.

The engine 10 is also provided with a blow-by gas treatment mechanism for treating combustion gas, i.e., blow-by gas, which is leaked into the crankcase 19 from the combustion chamber 17. The blow-by gas treatment mechanism includes a suction path 32 for guiding the blow-by gas in the crankcase 19 to a main separator 31 that is an oil separator provided in the head cover 13. The suction path 32 extends through the cylinder block 11 and the cylinder head 12, with a pre-separator 33 for oil separation being provided in a midway.

The main separator 31 is connected to the surge tank 60 in the intake passage 20 through a positive crankcase ventilation (PCV) valve 34 that is a differential pressure regulating valve and through a PCV passage 35. The PCV valve 34 opens when the pressure in the surge tank 60 becomes lower than the pressure in the main separator 31 so as to permit inflow of the blow-by gas from the main separator 31 to the surge tank 60. When the engine 10 is driven in a non-supercharging region (natural intake region), the pressure in the surge tank 60 becomes lower than the pressure in the main separator 31. As a result, the blow-by gas in the crankcase 19 is sucked into the surge tank 60 through the suction path 32, the main separator 31, the PCV valve 34, and the PCV passage 35. The sucked blow-by gas is sent to the combustion chamber 17 together with the intake air and is combusted.

The main separator 31 is further connected to an ejector 40. The ejector 40 is provided in the middle of an intake air circuit 36 that connects a downstream portion and an upstream portion of the compressor 24C in the intake passage 20. The ejector 40 is a well-known mechanism that sucks the blow-by gas in the main separator 31 and feeds the sucked blow-by gas into the intake air circuit 36 with use of Venturi effect. Although detailed description of the mechanism is omitted, the ejector 40 can obtain the Venturi effect basically by the air flowing from the downstream side to the upstream side of the compressor 24C in the intake air circuit 36 when the engine 10 is driven in the supercharging region. Accordingly, the blow-by gas in the crankcase 19 flows into the upstream portion of the compressor 24C through the suction path 32, the main separator 31, the ejector 40, and the intake air circuit 36. The blow-by gas inflow is carried to the combustion chamber 17 by the intake air in the intake passage 20 and is combusted therein.

The blow-by gas treatment mechanism also includes an atmospheric air introduction passage 37 for introducing the intake air into the crankcase 19. The atmospheric air introduction passage 37 extends from a middle portion between the air cleaner 21 and the compressor 24C in the intake passage 20 and through the head cover 13, the cylinder head 12, and the cylinder block 11 into the crankcase 19. In the middle of the atmospheric air introduction passage 37, an atmospheric air-side separator 38 is provided in the head cover 13 as an oil separator.

The intake system of the engine 10 in the present embodiment has the intake passage 20 equipped with the aforementioned various members, the intake manifold 29, the intake port 30, the blow-by gas treatment mechanism, the purging mechanism, and the like.

Various control of the engine 10 or the automatic transmission 39 is performed by an electronic control unit 50. The electronic control unit 50 includes a central processing unit (CPU) that performs arithmetic processing, a read only memory (ROM) that stores control programs and data, and a random-access memory (RAM) that temporarily stores arithmetic calculation results of the CPU and detection results of sensors.

The electronic control unit 50 receives detection signals of the air flowmeter 22, the supercharging pressure sensor 25, the temperature sensor 26, and the intake pressure sensor 54 described before. The electronic control unit 50 further receives detection signals of sensors such as a crank angle sensor 51 that detects a rotation angle (crank angle) of the crankshaft 18 in order to calculate an engine speed NE, a vehicle speed sensor 53 that detects a vehicle speed SP, and an accelerator operation amount sensor 52 that detects the operation amount of an accelerator pedal (hereinafter referred to as accelerator operation amount ACCP). The electronic control unit 50 is also provided with a pressure sensor 55 that detects an atmospheric pressure PAP.

The electronic control unit 50 performs various kinds of control in accordance with the engine operation state detected by the various sensors described before. For example, the electronic control unit 50 performs opening control of the throttle valve 28 so that the intake air amount corresponding to the accelerator operation amount ACCP or the like may be obtained.

The electronic control unit 50 calculates a fuel amount supplied to the combustion chamber 17 based on the engine operation state, and also calculates, based on the engine operation state, an injection division ratio Rp that is a ratio for dividing the calculated fuel amount into the amount of injection from the port injection valve 83 and the amount of injection from the cylinder injection valve 84. The electronic control unit 50 performs drive control of each of the injection valves so that the amounts of fuel corresponding to the injection division ratio Rp are injected from the port injection valve 83 and the cylinder injection valve 84. For example, in the case of the injection division ratio Rp=100%, only the port injection is executed to inject fuel from the port injection valve 83. In the case of the injection division ratio Rp=0%, only the cylinder injection is execute to inject fuel from the cylinder injection valve 84. In the case where the injection division ratio Rp is larger than 0% and smaller than 100%, the port injection and the cylinder injection are executed so that the fuel is injected from the port injection valve 83 and the cylinder injection valve 84 in accordance with the injection division ratio Rp.

The electronic control unit 50 also calculates target valve timing of the intake valve 81 or the exhaust valve 82 based on the engine operation state, and performs drive control of the intake side-variable valve timing mechanism 85 and the exhaust side-variable valve timing mechanism 86 to achieve such target valve timing. Incidentally, when a differential pressure is generated between an intake side and an exhaust side of the engine 10 by optimizing valve overlap of the intake valve 81 and the exhaust valve 82, a scavenging effect is obtained wherein intake air is drawn into the combustion chamber 17 while combustion gas is effectively scavenged. Accordingly, in the present embodiment, in a low speed area of the engine 10, the valve timing of the intake valve 81 and the exhaust valve 82 is set to obtain such a scavenging effect.

The electronic control unit 50 also calculates the purge rate PR based on the engine operation state, and performs opening control of the purge valve 92 to obtain the opening corresponding to the purge rate PR. The electronic control unit 50 also sets a gear stage instruction value GP of the automatic transmission 39 based on parameters such as an operative position of a gear shift lever provided in a vehicle cabin, the accelerator operation amount ACCP, and the vehicle speed SP. The electronic control unit 50 outputs the gear stage instruction value GP to the automatic transmission 39, and in response to the gear stage instruction value GP, the automatic transmission 39 changes the gear stage in accordance with the gear stage instruction value GP.

The electronic control unit 50 also functions as an intake system abnormality diagnosis device that diagnoses air leakage abnormality in the intake system downstream from the supercharger 24. In order to diagnose such leakage abnormality, the electronic control unit 50 includes a first air amount calculation unit 50A that calculates a first air amount GAM that is an intake air amount obtained from the detection value of the air flowmeter 22, and a second air amount calculation unit 50B that calculates a second air amount GIP that is an intake air amount obtained from the detection value of the intake pressure sensor 54. The electronic control unit 50 also includes a ratio calculation unit 50C that calculates a basic parameter BP represented by the ratio of the first air amount GAM to the second air amount GIP. The ratio of the first air amount to the second air amount is a value represented by "A/B" where "A" is the first air amount and "B" is the second air amount. The electronic control unit 50 also includes a supercharging region determination unit 50D that determines whether or not the engine 10 is driven in the supercharging region. The electronic control unit 50 also includes a first setting unit 50E that sets, as a supercharging region monitoring value TC, the ratio obtained when the supercharging region determination unit 50D determines that the engine 10 is driven in a supercharging region. The electronic control unit 50 also includes a second setting unit 50F that sets, as a non-supercharging region monitoring value NA, the ratio obtained when the supercharging region determination unit 50D determines that the engine 10 is driven in a non-supercharging region. The electronic control unit 50 includes an abnormality determination unit 50G that determines the presence or absence of the leakage abnormality of the intake system based on a deviation degree between the supercharging region monitoring value TC and the non-supercharging region monitoring value NA.

Figure 2:
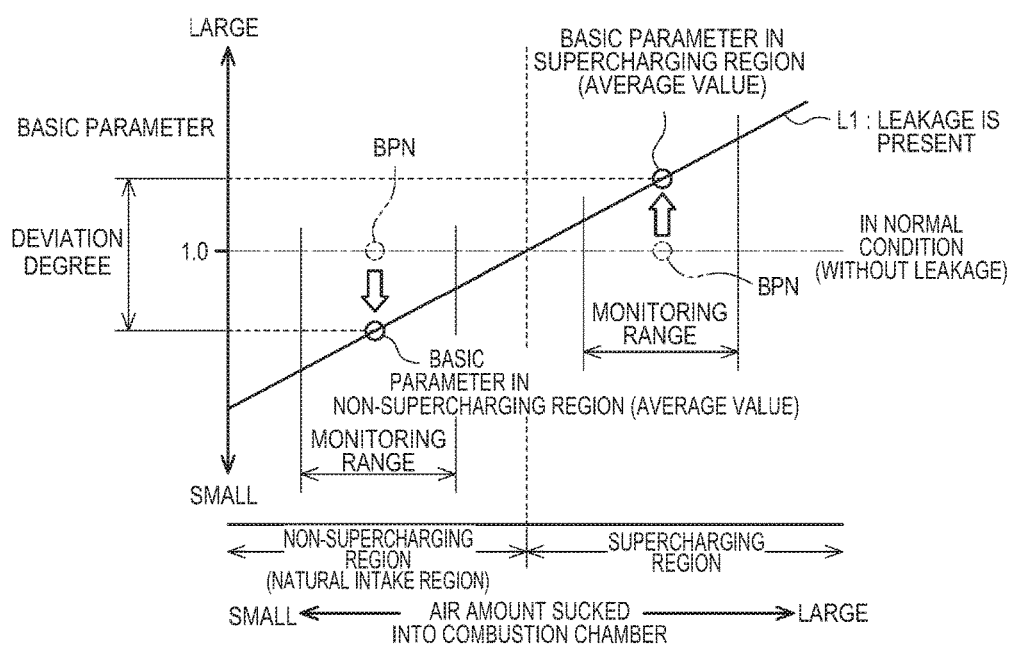
FIG. 2 is a graph view for describing the principle of abnormality diagnosis in the embodiment.

A description is now given of the principle for determining the aforementioned leakage abnormality in the present embodiment with reference to FIG. 2. First, in the normal condition where leakage abnormality does not occur in the intake system downstream from the supercharger 24, the first air amount GAM obtained from the detection value of the air flowmeter 22 and the second air amount GIP obtained from the detection value of the intake pressure sensor 54 become generally identical except for measurement errors, and do not deviate from each other.

Therefore, as illustrated in FIG. 2, when the ratio of the first air amount GAM to the second air amount GIP is defined as a basic parameter BP, a normal basic parameter BPN that is a basic parameter BP without leakage abnormality is generally equal to "1" regardless of the engine 10 being in the supercharging region or the non-supercharging region.

However, when the leakage abnormality as describe before occurs in the intake system downstream from the supercharger 24 (for example, when a portion designated by "A" in FIG. 1, i.e., a portion of the intake air circuit 36 connected with a downstream side of the compressor 24C, is disconnected from the intake passage 20, so that a hole corresponding to the inner dimension of the intake air circuit 36 is formed in the intake passage 20), a value of the first air amount GAM becomes different from a value of the second air amount GIP.

That is, when the engine 10 is driven in the supercharging region, the pressure in the intake system downstream from the supercharger 24 becomes higher than the atmospheric pressure. Accordingly, air leaks to the outside of the intake system from a location where leakage abnormality is occurring. Accordingly, the second air amount GIP becomes less than the first air amount GAM, and so the basic parameter BP when leakage abnormality occurs becomes larger than "1" as illustrated with a solid line L1. As the engine operation state shifts to a higher load state, the air amount sucked into the combustion chamber 17 increases and causes a larger difference between the first air amount GAM and the second air amount GIP. As a result, the basic parameter BP tends to become larger.

Meanwhile, when the engine 10 is driven in the non-supercharging region (natural intake region), the pressure in the intake system downstream from the supercharger 24 becomes lower than the atmospheric pressure. As a result, air is sucked into the intake system from the location where the leakage abnormality is occurring. Accordingly, the second air amount GIP becomes more than the first air amount GAM, and the basic parameter BP when the leakage abnormality occurs becomes smaller than "1" as illustrated with the solid line L1. As the engine operation state shifts to a lower load state, the air amount sucked into the combustion chamber 17 decreases and causes a smaller difference between the first air amount GAM and the second air amount GIP. As a result, the basic parameter BP tends to become smaller.

Thus, in the engine 10 including the supercharger 24, when leakage abnormality occurs in the intake system downstream from the supercharger 24, the value of the basic parameter BP in the supercharging region becomes larger than the value in the normal condition, while the basic parameter BP in the non-supercharging region becomes smaller than the value in the normal condition. Accordingly, a deviation degree between the basic parameter BP in the supercharging region and the basic parameter BP in the non-supercharging region significantly increases. As a result, even when the leakage abnormality is relatively small, the occurrence of such abnormality is easily reflected on the deviation degree.

Accordingly, in the present embodiment, such a basic parameter BP in the supercharging region is set as a supercharging region monitoring value, while the basic parameter BP in the non-supercharging region is set as a non-supercharging region monitoring value. More specifically, a monitoring condition to calculate the basic parameter BP in the supercharging region is set, and an average value of the basic parameters BP in the supercharging region, which are calculated when the monitoring condition is satisfied, is set as a supercharging region monitoring value TC. A monitoring condition to calculate the basic parameter BP in the non-supercharging region is also set, and an average value of the basic parameters BP in the non-supercharging region, which are calculated when the monitoring condition is satisfied, is set as a non-supercharging region monitoring value NA. The presence or absence of leakage abnormality is determined based on the deviation degree between the supercharging region monitoring value TC and the non-supercharging region monitoring value NA.

Figure 3:
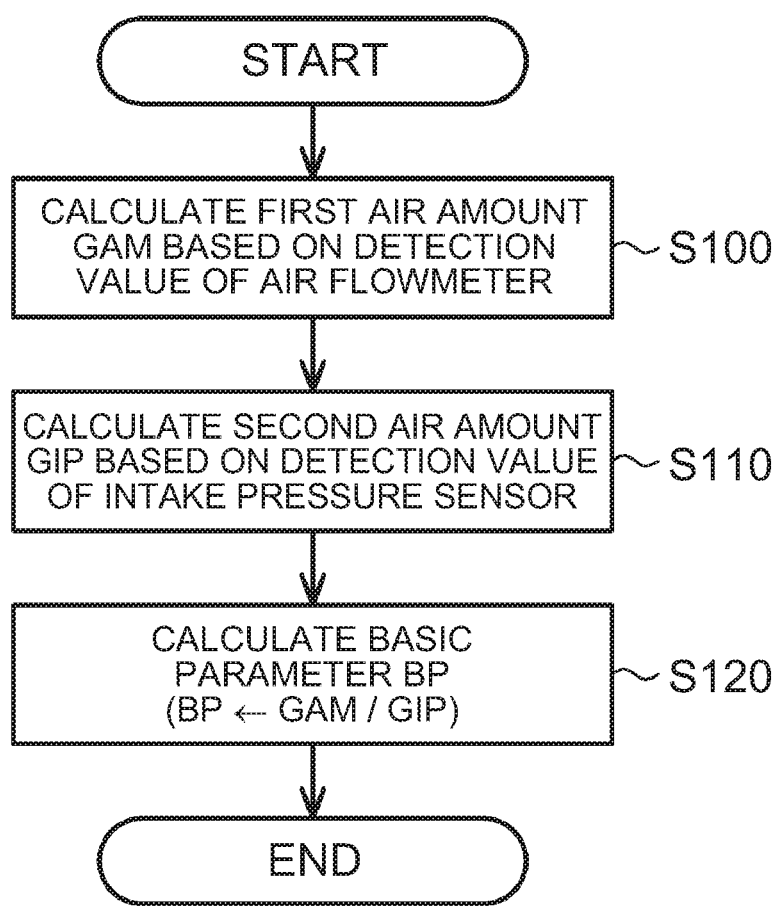
FIG. 3 is a flowchart illustrating procedures for calculating a basic parameter in the embodiment.

Hereinafter, a description is given of a series of processing procedures that the electronic control unit 50 executes in order to determine the leakage abnormality in the intake system based on the principle described before. Processing procedures for calculating the basic parameter BP is illustrated in FIG. 3. The processing is repeatedly executed for each prescribed period by the electronic control unit 50 after engine start.

Once the processing is started, the electronic control unit 50 calculates the first air amount GAM based on the detection value of the air flowmeter 22 (S100). In step S100, the first air amount GAM per revolution of the crankshaft 1 is calculated based on a following expression (1).

$$GAM = GA \times 60/NE \times \{(PR+100) \times 0.01\} \quad (1)$$

where GAM is a first air amount [unit: g/rev], GA is an intake air amount detected by the air flowmeter 22 [unit: g/s], NE is an engine speed [unit: rev/min], and PR is a purge rate [unit: %]. Next, the electronic control unit 50 calculates the second air amount GIP based on the detection value of the intake pressure sensor 54 (S110). In step S110, the second air amount GIP per revolution of the crankshaft 1 is calculated based on a following expression (2).

$$GIP = PIM \times KP \times KF \times KT \quad (2)$$

where GIP is a second air amount [unit: g/r], PIM is intake pressure detected with the intake pressure sensor 54 [unit: kPa], KP is a conversion coefficient for converting intake pressure into air amount [unit: g/rev/kPa], KF is a filling efficiency coefficient, and KT is an intake air temperature correction coefficient. The conversion coefficient KP is a value obtained from a following expression (3), the value corresponding to displacement of the engine 10.

$$KP = ED \times AD/2/(101.325) \quad (3)$$

where KP is a conversion coefficient [unit: g/rev/kPa], ED is displacement of the engine 10 [example: 1.998 liters (L)], AD is air density at one atmosphere [atm] and 25° C. [example: 1.184 g/L], 2 is the number of revolutions of the crankshaft in one cycle [unit: rev], 101.325 is a numerical value for converting kilopascal [kPa] that is a detection unit of the intake pressure sensor into atmospheric pressure [atm], the value representing one atm in kilopascal [unit: kPa]. The filling efficiency coefficient KF is a coefficient for reflecting the filling efficiency of the intake air in the cylinder 16 on the second air amount GIP. The filling efficiency coefficient KF is variably set based on the engine speed NE and the intake pressure PIM. The filling efficiency coefficient KF is compatible within the range of a predetermined engine speed NE. Moreover, when the aforementioned injection division ratio Rp changes, the intake air filling efficiency changes either. That is, as the amount of the fuel injected from the cylinder injection valve 84 increases, the inside of the combustion chamber 17 is cooled more by vaporization latent heat of the fuel. This brings about change in the intake air filling efficiency. Accordingly, in the present embodiment, in order to avoid the influence of such change in the injection division ratio Rp on the filling efficiency coefficient KF, the filling efficiency coefficient KF is made compatible in the state where the injection division ratio Rp=0%, i.e., in the state where only the cylinder injection is performed. The filling efficiency coefficient KF may be corrected in accordance with the injection division ratio Rp. Moreover, the valve timing when the aforementioned scavenging is performed is largely different from the valve timing when the scavenging is not performed. This also brings about change in the intake air filling efficiency. Therefore, in the present embodiment, the filling efficiency coefficient KF is made compatible in the state where scavenging is not performed. Note that not only the filling efficiency coefficient KF made compatible in the state where scavenging is not performed but also the filling efficiency coefficient KF made compatible in the state where scavenging is performed may be prepared in advance, and the filling efficiency coefficient KF may be switched depending on whether or not scavenging is performed.

The intake air temperature correction coefficient KT is a coefficient for correcting the intake air filling efficiency that is variable with the temperature of air. The coefficient is variably set based on the surge-tank inner temperature THS. Once the first air amount GAM and the second air amount GIP are calculated in this way, the electronic control unit 50 calculates the basic parameter BP (S120), and temporarily ends the processing. In step S120, the ratio of the first air amount GAM to the second air amount GIP is calculated so as to calculate the basic parameter BP based on a following expression (4).

$$\text{Basic parameter BP} = \text{first air amount GAM/second air amount GIP} \quad (4)$$

Once the basic parameter BP is calculated, the electronic control unit 50 temporarily stores the calculated value in the random access memory. Whenever calculating the basic parameter BP, the electronic control unit 50 overwrites the basic parameter BP temporarily stored in the random access memory with the newly calculated basic parameter BP.

Figure 4A:
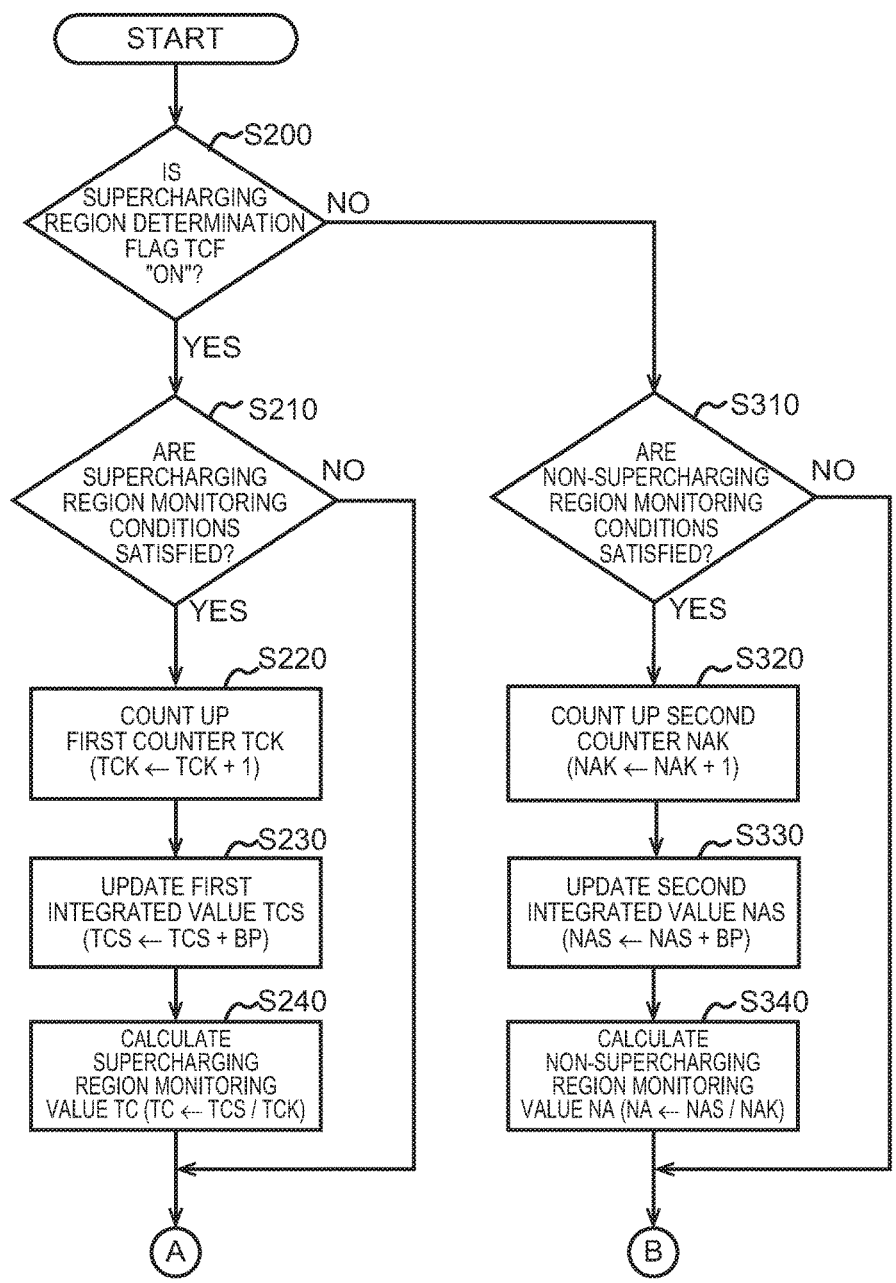
FIGS. 4A and 4B are a flowchart illustrating procedures for calculating a supercharging region monitoring value and a non-supercharging region monitoring value in the embodiment.
Figure 4B:
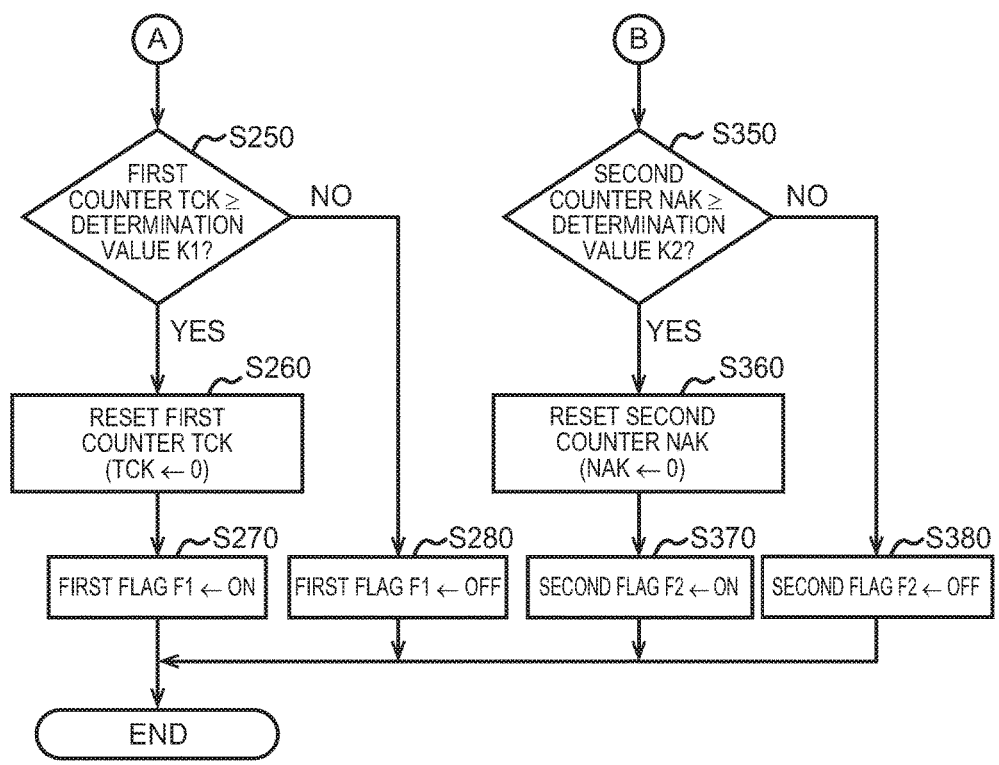

Next, a description is given of processing procedures for calculating the supercharging region monitoring value TC and the non-supercharging region monitoring value NA with reference to FIGS. 4A and 4B. The processing is also repeatedly executed for each prescribed period by the electronic control unit 50 after engine start.

As illustrated in FIGS. 4A and 4B, once the processing is started, the electronic control unit 50 determines whether or not a supercharging region determination flag TCF is "ON" (S200). The supercharging region determination flag TCF is indicative of the result of supercharging region determination that determines whether or not the engine 10 is operated in the supercharging region. At the start of the engine, the flag TCF is set to an initial value "OFF.". When it is determined that the engine 10 is operated in the supercharging region as a result of the supercharging region determination, the flag is set to "ON." When it is determined that the engine 10 is not operated in the supercharging region, i.e., when the engine 10 is operated in the non-supercharging region (natural intake region), the flag is set to "OFF." The processing of the supercharging region determination for setting the supercharging region determination flag TCF is performed by the electronic control unit 50 as separate processing. Such supercharging region determination can properly be made as necessary. Described below is an example of the determination procedures.

First, the electronic control unit 50 acquires a supercharging-pressure reference value PTCB and an atmospheric-pressure reference value PAPB in advance when the vehicle and the engine 10 are stopped. The supercharging-pressure reference value PTCB is an average value of the supercharging pressures PTC detected a plurality of times when the amount of variation in the supercharging pressures PTC detected with the supercharging pressure sensor 25 stably falls in a specified range in the state where the vehicle and the engine 10 are stopped. The atmospheric-pressure reference value PAPB is an average value of the atmospheric pressures PAP detected a plurality of times when the amount variation in the atmospheric pressure PAP detected with the atmospheric pressure sensor 55 stably falls in a specified range in the state where the vehicle and the engine 10 are stopped.

After engine start, the electronic control unit 50 subtracts the supercharging-pressure reference value PTCB from a current supercharging pressure PTC detected with the supercharging pressure sensor 25 to calculate a supercharging-pressure change amount TCH that is a change amount of the current supercharging pressure from the supercharging-pressure reference value PTCB. The electronic control unit 50 also subtracts the atmospheric-pressure reference value PAPB from a current atmospheric pressure PAP detected with the atmospheric-pressure sensor 55 to calculate an atmospheric-pressure change amount APH which is a change amount of the current atmospheric pressure from the atmospheric-pressure reference value PAPB.

Then, the atmospheric-pressure change amount APH is subtracted from the supercharging-pressure change amount TCH to calculate a corrected supercharging-pressure change amount HTCH with the change amount of the atmospheric pressure included in the supercharging-pressure change amount TCH being corrected.

When the corrected supercharging-pressure change amount HTCH satisfies a following condition A, and the state where the condition A is satisfied continues for predetermined time or more, the electronic control unit 50 determines that the engine 10 is operated in the supercharging region and sets the supercharging region determination flag TCF to "ON." When the condition A is not satisfied, or when the state where the condition A is satisfied does not continue for the predetermined time or more, the supercharging region determination flag TCF is set to "OFF."

Condition A: corrected supercharging-pressure change amount HTCH (=supercharging-pressure change amount TCH−atmospheric-pressure change amount APH)≥supercharging region determination value ETU. Note that the supercharging region determination value ETU is a preset value that makes it possible to determine that the engine 10 is operated in the supercharging region based on the fact that the value of a left-hand side of the expression shown in the condition A is equal to or more than the supercharging region determination value ETU.

Since the electronic control unit 50 constantly performs such supercharging region determination during operation of the engine, the supercharging region determination flag TCF is set to "ON" when the engine 10 is operated in the supercharging region, whereas the supercharging region determination flag TCF is set to "OFF" when the engine 10 is operated in the non-supercharging region.

In step S200, when it is determined that the supercharging region determination flag TCF is "ON" (S200: YES), the electronic control unit 50 determines whether or not supercharging region monitoring conditions are satisfied (S210). The supercharging region monitoring conditions include conditions C1 to C4 and conditions TC1 to TC5 stated below. When all of these conditions are satisfied, the electronic control unit 50 determines that the supercharging region monitoring conditions are satisfied.

•Condition C1: the vehicle is traveling. •Condition C2: scavenging is not performed. •Condition C3: Not in a transient state involving change in the amount of air sucked into the combustion chamber 17.
•Condition C4: the surge-tank inner temperature THS is higher than predetermined temperature. •Condition TC1: the engine speed NE is within a predetermined range. •Condition TC2: the second air amount GIP is in a predetermined range that is set to be high to some extent (equivalent to the supercharging region monitoring range illustrated in FIG. 2).
•Condition TC3: only the cylinder injection is performed.
•Condition TC4: the gear stage instruction value GP is equal to or more than a predetermined gear stage. •Condition TC5: calculation of the supercharging region monitoring value TC is not completed.

The condition C1 is satisfied when the vehicle speed SP is equal to or more than a specified value. The condition C2 is a compatibility condition of the filling efficiency coefficient KF used for calculating the aforementioned second air amount GIP. Positive determination is made when the valve timing of the intake valve 81 and the exhaust valve 82 is not set to the aforementioned scavenging valve timing.

The condition C3 is set in order to calculate the supercharging region monitoring value TC using the first air amount GAM and the second air amount GIP calculated in the state where change in the amount of air sucked into the combustion chamber 17 is stably small. Positive determination is made when, for example, predetermined time has elapsed after the change in the opening of the throttle valve 28.

Since the temperature sensor 26 that detects the surge-tank inner temperature THS may have a measurement error under cryogenic temperature, the condition C4 is set in order to prevent calculation of the supercharging region monitoring value TC in the region where such measurement error may possibly occur.

The condition TC1 is set because the filling efficiency coefficient KF is made to be compatible with the engine speed NE in a predetermined range. The condition TC2 is set because of the subsequent reason. That is, as illustrated in FIG. 2, as the amount of air sucked into the combustion chamber 17 increases, the value of the basic parameter BP calculated in the supercharging region becomes larger, so that the aforementioned deviation between the supercharging region monitoring value TC and the non-supercharging region monitoring value NA becomes more notable. Accordingly, the condition TC2 is set in order to calculate the supercharging region monitoring value TC within the range in which the amount of air sucked into the combustion chamber 17 is large to some extent.

The condition TC3 is a compatibility condition of the filling efficiency coefficient KF. Positive determination is made when the injection division ratio Rp is "0%." The condition TC4 is set because of the subsequent reason. That is, as the gear stage instruction value GP of the automatic transmission 39 indicates a lower gear stage, the transmission gear ratio becomes larger. As a result, change in the engine speed when the accelerator pedal is operated becomes notable, so that the amount of air sucked into the combustion chamber 17 becomes less likely to be stabilized. Accordingly, the condition TC4 is set in order to calculate the supercharging region monitoring value TC using the first air amount GAM and the second air amount GIP calculated in the state where change in the amount of air sucked into the combustion chamber 17 is stably small. For example, positive determination is made when the gear stage instruction value GP is a second speed or higher.

The condition TC5 is satisfied when a first flag F1 is set to "OFF", the first flag F1 being indicative of whether or not calculation of the supercharging region monitoring value TC is completed. At the time of engine start, the first flag F1 is set to an initial value "OFF."

In step S210, when it is determined that the aforementioned supercharging region monitoring conditions are satisfied, (S210:YES), the electronic control unit 50 increments the current value of a first counter TCK by "1" so as to count up the first counter TCK (S220). The first counter TCK has an initial value of "0."

Next, the electronic control unit 50 acquires the current basic parameter BP temporarily stored in the random access memory and updates a first integrated value TCS (S230). The first integrated value TCS is a value obtained by integrating the basic parameters BP calculated in the state where the supercharging region monitoring conditions are satisfied in the supercharging region. The first integrated value TCS has an initial value of "0." In step S230, the first integrated value TCS is updated by adding the currently calculated basic parameter BP to the current first integrated value TCS.

Next, the electronic control unit 50 calculates the supercharging region monitoring value TC (S240). In step S240, the first integrated value TCS updated in step S230 is divided by the value of the first counter TCK counted up in step S220 to calculate the supercharging region monitoring value TC. In short, the supercharging region monitoring value TC is an average value of the basic parameters BP calculated in the state where the supercharging region monitoring conditions are satisfied in the supercharging region.

In the case where negative determination is made in step S210 (S210: NO) or after execution of the processing of step S240, the electronic control unit 50 determines whether or not the first counter TCK counted up in step S220 is equal to or more than a determination value K1 (S250). The determination value K1 is a preset value that makes it possible to determine, based on the first counter TCK being equal to or more than the determination value K1, that the number of times of calculation of the supercharging region monitoring value TC, i.e., the number of times of sampling the basic parameter BP and obtaining an average value, is large enough to complete the calculation of the supercharging region monitoring value TC.

When it is determined in step S250 that the first counter TCK is equal to or more than the determination value K1 (S250: YES), the electronic control unit 50 resets the first counter TCK to "0" (S260), sets the first flag F1 to "ON" (S270), and temporarily ends the processing.

On the contrary, when it is determined in step S250 that the first counter TCK is less than the determination value K1 (S250: NO), the electronic control unit 50 sets the first flag F1 to "OFF" (S280), and temporarily ends the processing.

Until it is determined in step S250 that the first counter TCK is equal to or more than the determination value K1, each processing of step S200, step S210, step S220, step S230, step S240, step S250, and step S280 is repeatedly executed, so that the supercharging region monitoring value TC is updated in step S240. When it is determined in step S250 that the first counter TCK is equal to or more than the determination value K1, update of the supercharging region monitoring value TC in step S240 is ended, and therefore calculation of the supercharging region monitoring value TC is completed. Then, the first flag F1 is set to "ON", which indicates that calculation of the supercharging region monitoring value TC is completed.

In step S200, when it is determined that the supercharging region determination flag TCF is "OFF" (S200: NO), the electronic control unit 50 determines whether or not non-supercharging region monitoring conditions are satisfied (S310). The non-supercharging region monitoring conditions include the aforementioned conditions C1 to C4 and conditions NA1 to NA5 described below. When all of these conditions are satisfied, the electronic control unit 50 determines that the non-supercharging region monitoring conditions are satisfied.

The reason why the aforementioned condition C3 is set as a non-supercharging region monitoring condition is the same as the reason previously described. That is, the condition is set in order to calculate the non-supercharging region monitoring value NA using the first air amount GAM and the second air amount GIP calculated in the state where change in the amount of air sucked into the combustion chamber 17 is stably small. The reason why the aforementioned condition C4 is set as a non-supercharging region monitoring condition is also the same as the reason previously described. That is, since the temperature sensor 26 that detects the surge-tank inner temperature THS may have a measurement error under cryogenic temperature, the condition C4 is set in order to prevent calculation of the non-supercharging region monitoring value NA in the region where such measurement error may possibly occur.

•Condition NA1: the engine speed NE is within a predetermined range. •Condition NA2: the second air amount GIP is in a predetermined range that is set to be low to some extent (equivalent to the non-supercharging region monitoring range illustrated in FIG. 2).
•Condition NA3: only the cylinder injection is performed. •Condition NA4: the gear stage instruction value GP is equal to or more than a predetermined gear stage. •Condition NA5: calculation of the non-supercharging region monitoring value NA is not completed.

Like the condition TC1, the condition NA1 is set because the filling efficiency coefficient KF is made to be compatible with the engine speed NE in a predetermined range. The condition NA2 is set because of the subsequent reason. That is, as illustrated in FIG. 2, as the amount of air sucked into the combustion chamber 17 decreases, the value of the basic parameter BP calculated in the non-supercharging region becomes smaller, so that the aforementioned deviation between the supercharging region monitoring value TC and the non-supercharging region monitoring value NA becomes more notable. Accordingly, the condition NA2 is set in order to calculate the non-supercharging region monitoring value NA within the range in which the amount of air sucked into the combustion chamber 17 is small to some extent.

Like the condition TC3, the condition NA3 is a compatibility condition of the filling efficiency coefficient KF. Positive determination is made when the injection division ratio Rp is "0%." Like the condition TC4, the condition NA4 is also set for the subsequent reason. That is, as the gear stage instruction value GP of the automatic transmission 39 indicates a lower gear stage, the transmission gear ratio becomes larger. As a result, change in the engine speed when the accelerator pedal is operated becomes notable, so that the amount of air sucked into the combustion chamber 17 becomes less likely to be stabilized. Accordingly, the condition NA4 is set in order to calculate the non-supercharging region monitoring value NA using the first air amount GAM and the second air amount GIP calculated in the state where change in the amount of air sucked into the combustion chamber 17 is stably small. For example, positive determination is made when the gear stage instruction value GP is a second speed or higher.

The condition NA5 is satisfied when a second flag F2 is set to "OFF", the second flag F2 being indicative of whether or not calculation of the non-supercharging region monitoring value NA is completed. At the time of engine start, the second flag F2 is set to an initial value "OFF."

In step S310, when it is determined that the aforementioned non-supercharging region monitoring conditions are satisfied, (S310: YES), the electronic control unit 50 increments the current value of a second counter NAK by "1" so as to count up the second counter NAK (S320). The second counter NAK has an initial value of "0."

Next, the electronic control unit 50 acquires the current basic parameter BP temporarily stored in the random access memory and updates a second integrated value NAS (S330). The second integrated value NAS is a value obtained by integrating the basic parameters BP calculated in the state where the non-supercharging region monitoring conditions are satisfied in the non-supercharging region. The second integrated value NAS has an initial value of "0." In step S330, the second integrated value NAS is updated by adding a currently calculated basic parameter BP to the current second integrated value NAS.

Next, the electronic control unit 50 calculates the non-supercharging region monitoring value NA (S340). In step S340, the second integrated value NAS updated in step S330 is divided by the value of the second counter NAK counted up in step S320 to calculate a non-supercharging region monitoring value NA. In short, the non-supercharging region monitoring value NA is an average value of the basic parameters BP calculated in the state where the non-supercharging region monitoring conditions are satisfied in the non-supercharging region.

In the case where negative determination is made in step S310 (S310: NO) or after execution of the processing of step S340, the electronic control unit 50 determines whether or not the second counter NAK counted up in step S320 is equal to or more than a determination value K2 (S350). The determination value K2 is a preset value that makes it possible to determine, based on the second counter NAK being equal to or more than the determination value K2, that the number of times of calculation of the non-supercharging region monitoring value NA, i.e., the number of times of sampling the basic parameter BP and obtaining an average value, is large enough to complete calculation of the non-supercharging region monitoring value NA.

When it is determined in step S350 that the second counter NAK is equal to or more than the determination value K2 (S350: YES), the electronic control unit 50 resets the second counter NAK to "0" (S360), sets the second flag F2 to "ON" (S370), and temporarily ends the processing.

On the contrary, when it is determined in step S350 that the second counter NAK is less than the determination value K2 (S350: NO), the electronic control unit 50 sets the second flag F2 to "OFF" (S380), and temporarily ends the processing.

Until it is determined in step S350 that the second counter NAK is equal to or more than the determination value K2, each processing of step S200, step S310, step S320, step S330, step S340, step S350, and step S380 is repeatedly executed, so that the non-supercharging region monitoring value NA is updated in step S340. When it is determined in step S350 that the second counter NAK is equal to or more than the determination value K2, update of the non-supercharging region monitoring value NA in step S340 is ended, and therefore calculation of the non-supercharging region monitoring value NA is completed. Then, the second flag F2 is set to "ON", which indicates that calculation of the non-supercharging region monitoring value NA is completed.

Next, the processing procedures for determining the presence or absence of the leakage abnormality in the intake system will be described with reference to FIG. 5. The processing is also repeatedly executed for each prescribed period by the electronic control unit 50 after engine start.

When the processing is started, the electronic control unit 50 determines whether or not execution conditions of abnormality determination is satisfied (S400). As the execution conditions of the abnormality determination, following conditions E1 to E3 are set. When all the conditions are satisfied, the electronic control unit 50 determines that the execution conditions of abnormality determination are satisfied.

•Condition E1: calculation of the supercharging region monitoring value TC is completed. •Condition E2: calculation of the non-supercharging region monitoring value NA is completed. •Conditions E3: determination of leakage abnormality is not completed.

The condition E1 is satisfied when the first flag F1 is set to "ON." The condition E2 is satisfied when the second flag F2 is set to "ON."

The condition E1 is satisfied when a determination completion flag FH is set to "OFF", the flag being indicative of whether or not determination of the leakage abnormality is completed. At the time of engine start, the determination completion flag FH is set to an initial value "OFF."

When it is determined in step S400 that the aforementioned execution conditions of the abnormality determination are not satisfied (S400: NO), the electronic control unit 50 temporarily ends the processing. When it is determined that the aforementioned execution conditions of the abnormality determination are satisfied, (S400: YES), the electronic control unit 50 calculates a ratio of the supercharging region monitoring value TC to the non-supercharging region monitoring value NA based on a following expression (5), the ratio indicating a deviation degree between the supercharging region monitoring value TC and the non-supercharging region monitoring value NA. The electronic control unit 50 uses the calculated value as a diagnostic value JDR (S410).

$$\text{Diagnostic value JDR} = \text{supercharging region monitoring value TC/non-supercharging region monitoring value NA} \quad (5)$$

Next, the electronic control unit 50 determines whether or not the diagnostic value JDR is larger than a threshold value α (S420). The threshold value α is a preset value that makes it possible to determine that leakage abnormality is occurring in the intake system based on the diagnostic value JDR being larger than the threshold value α.

When the diagnostic value JDR is larger than the threshold value α (S420: YES), the electronic control unit 50 determines that the leakage abnormality is present (S430), sets the determination completion flag FH to "ON" (S450), and temporarily ends the processing.

When the diagnostic value JDR is equal to or less than the threshold value a (S420: NO), the electronic control unit 50 determines that the leakage abnormality is not present (S440), sets the determination completion flag FH to "ON" (S450), and temporarily ends the processing.

According to the present embodiment described in the foregoing, the following operational effects can be obtained. (1) As described in the foregoing, in the engine 10 including the supercharger 24, when leakage abnormality is occurring in the intake system downstream from the supercharger 24, the supercharging region monitoring value TC becomes larger than the ratio in the normal condition, while the non-supercharging region monitoring value NA becomes smaller than the ratio in the normal condition. As a result, the deviation degree between the supercharging region monitoring value TC and the non-supercharging region monitoring value NA increases significantly. Therefore, even when the level of the leakage abnormality is relatively small, occurrence of such abnormality becomes easily reflected on the deviation degree.

Accordingly, in the present embodiment, the presence or absence of the leakage abnormality in the intake system is determined based on the deviation degree between supercharging region monitoring value TC and the non-supercharging region monitoring value NA. Therefore, it becomes possible to more accurately diagnose the leakage abnormality.

(2) As the deviation degree between the supercharging region monitoring value TC and the non-supercharging region monitoring value NA increases, the diagnostic value JDR that is a ratio of the supercharging region monitoring value TC to the non-supercharging region monitoring value NA becomes larger. Accordingly, as illustrated in FIG. 5, when the diagnostic value JDR is larger than the preset threshold value α (S420: YES), the presence of leakage abnormality is determined (S430). This makes it possible to appropriately determine the leakage abnormality based on the deviation degree.

(3) Expressing the deviation degree as a ratio of the supercharging region monitoring value TC to the non-supercharging region monitoring value NA makes it possible to suppress the influence of detection errors of the air flowmeter 22 and the intake pressure sensor 54 on the deviation degree.

That is, the detection error of the air flowmeter 22 is defined as ±EA %, and the detection error of the intake pressure sensor 54 is defined as ±EB %. An actual amount of air that passes a portion provided with the air flowmeter 22 in the supercharging region (an amount of air per one revolution of the crankshaft) is defined as A1. An actual amount of air that passes a portion provided with the intake pressure sensor 54 in the supercharging region (an amount of air per one revolution of the crankshaft) is defined as B1. An actual amount of air that passes a portion provided with the air flowmeter 22 in the non-supercharging region (an amount of air per one revolution of the crankshaft) is defined as A2. An actual amount of air that passes a portion provided with the intake pressure sensor 54 in the non-supercharging region (an amount of air per one revolution of the crankshaft) is defined as B1.

In this case, the first air amount GAM obtained from a detection value of the air flowmeter 22 in the supercharging region can be expressed as $[A1 \times (1 \pm EA \times 0.01)]$. Moreover, the second air amount GIP obtained from a detection value of the intake pressure sensor 54 in the supercharging region can be expressed as $[B1 \times (1 \pm EB \times 0.01)]$. The first air amount GAM obtained from a detection value of the air flowmeter 22 in the non-supercharging region can be expressed as $[A2 \times (1 \pm EA \times 0.01)]$. The second air amount GIP obtained from a detection value of the intake pressure sensor 54 in the non-supercharging region can be expressed as $[B2 \times (1 \pm EB \times 0.01)]$.

Therefore, the supercharging region monitoring value TC indicative of the ratio of the first amount of air GAM to the second amount of air GIP in the supercharging region is expressed as $[\{A1 \times (1 \pm EA \times 0.01)\}/\{B1 \times (1 \pm EB \times 0.01)\}]$. The non-supercharging region monitoring value NA indicative of a ratio of the first amount of air GAM to the second amount of air GIP in the non-supercharging region is expressed as $[\{A2 \times (1 \pm EA \times 0.01)\}/\{B2 \times (1 \pm EB \times 0.01)\}]$. In this case, when the ratio of the supercharging region monitoring value TC to the non-supercharging region monitoring value NA is obtained by multiplying the supercharging region monitoring value TC by a reciprocal of the non-supercharging region monitoring value NA. Accordingly, a term $[(1 \pm EA \times 0.01)/(1 \pm EB \times 0.01)]$ included in the supercharging region monitoring value TC and a term $[(1 \pm EA \times 0.01)/(1 \pm EB \times 0.01)]$ included in the non-supercharging region monitoring value NA cancel each other to be "1". Therefore, the detection errors of the air flowmeter 22 and the intake pressure sensor 54 are no longer included in the diagnostic value JDR that is a ratio of the supercharging region monitoring value TC to the non-supercharging region monitoring value NA, so that the influence of such a detection error on the diagnostic value JDR is suppressed. As a result, the influence of detection errors on the accuracy of abnormality diagnosis can be suppressed.

The embodiment may also be modified and implemented as described below. •As a value indicative of the deviation degree between the supercharging region monitoring value TC and the non-supercharging region monitoring value NA, the ratio of the supercharging region monitoring value TC to the non-supercharging region monitoring value NA is calculated. In addition, since a difference between the supercharging region monitoring value TC and the non-supercharging region monitoring value NA becomes larger as the deviation degree between the supercharging region monitoring value TC and the non-supercharging region monitoring value NA increases, the presence of leakage abnormality in the intake system may be determined when the difference is larger than a preset specified value. Such a modification can be implemented by executing the processing of steps S500 and S510 illustrated in FIG. 6 in place of the processing of steps S410 and S420 illustrated in FIG. 5, for example.

Figure 5:
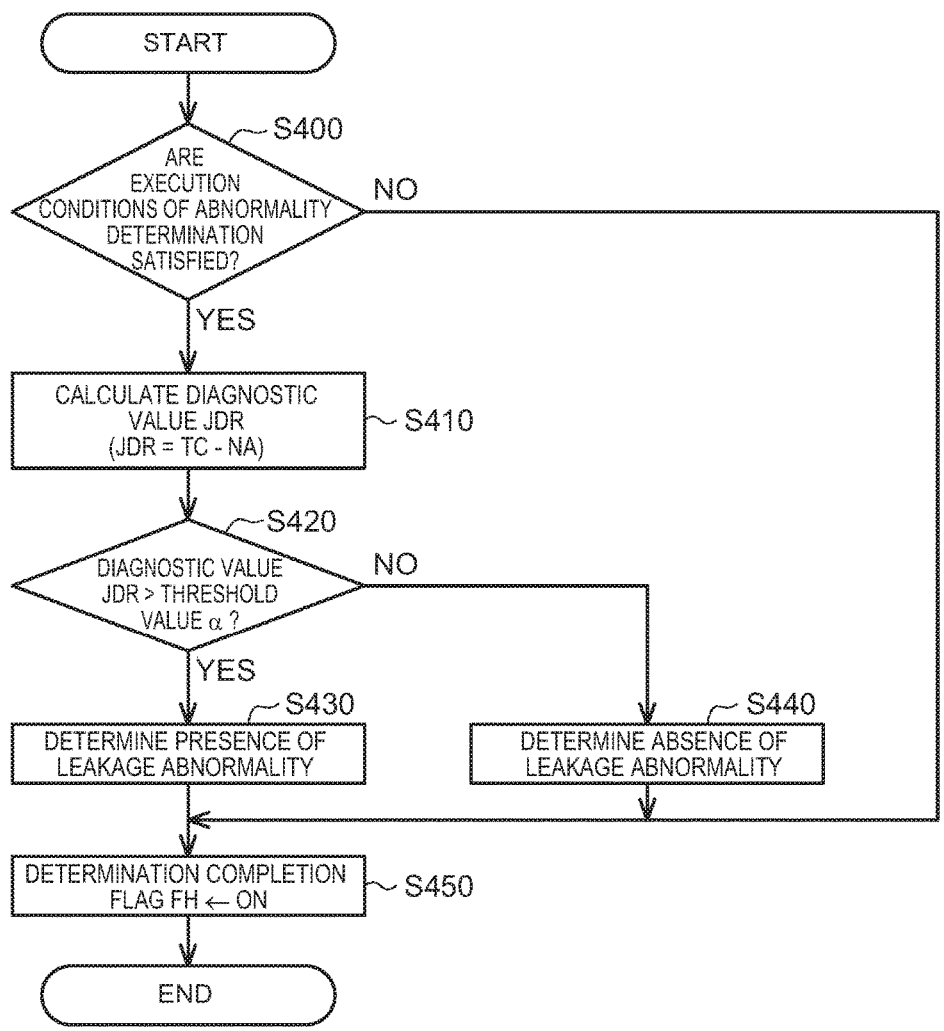
FIG. 5 is a flowchart illustrating procedures for determining abnormality in the embodiment.
Figure 6:
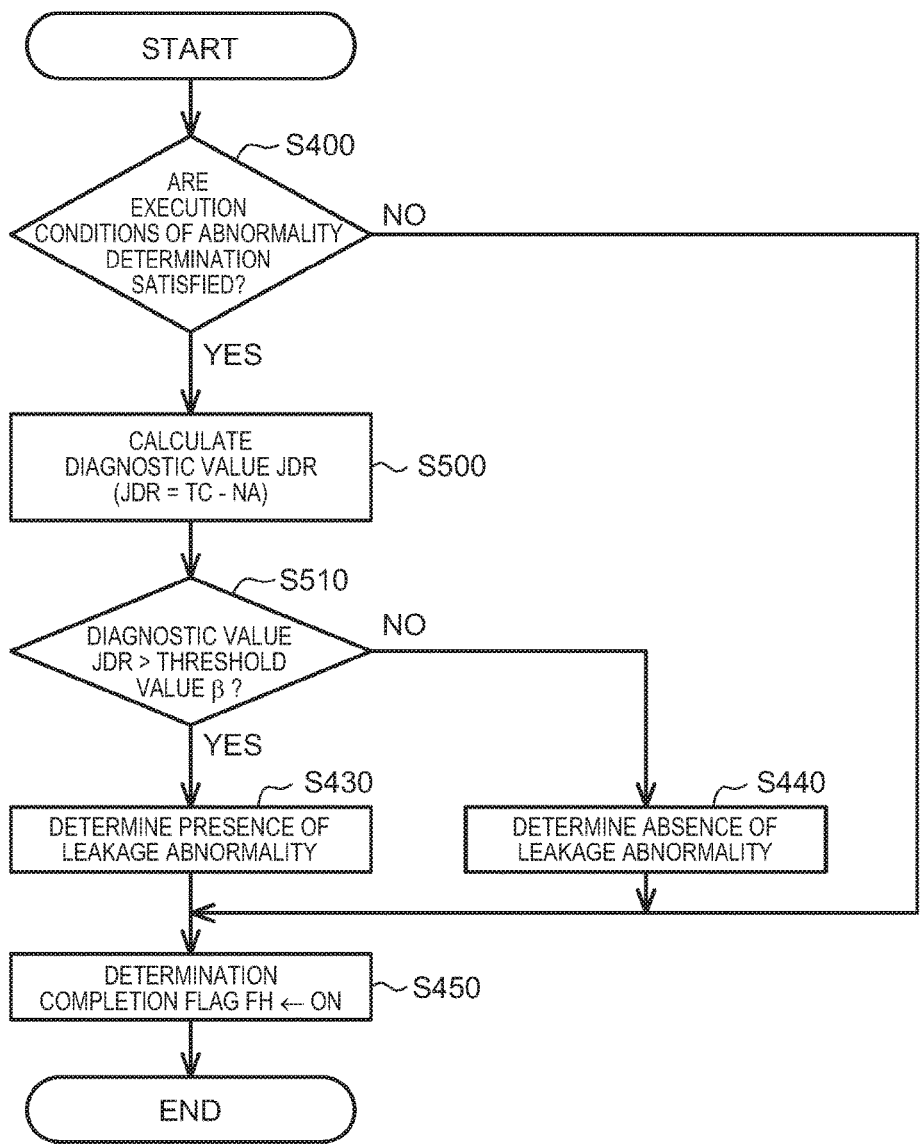
FIG. 6 is a flowchart illustrating procedures for determining abnormality in a modification of the embodiment.

As illustrated in FIG. 6, in this modification, when it is determined that the aforementioned execution conditions of the abnormality determination are satisfied in step S400 illustrated in FIG. 5 (S400: YES), the electronic control unit 50 performs following processing. That is, the electronic control unit 50 sets a difference between the supercharging region monitoring value TC and the non-supercharging region monitoring value NA as a value indicative of the deviation degree between the supercharging region monitoring value TC and the non-supercharging region monitoring value NA based on a following expression (6). The electronic control unit 50 then uses the calculated value as a diagnostic value JDR (S500).

Diagnostic value JDR=supercharging region monitoring value TC−non-supercharging region monitoring value NA (6)

Next, the electronic control unit 50 determines whether or not the diagnostic value JDR is larger than a threshold value β (S510). The threshold value β is a preset value that makes it possible to determine that leakage abnormality is occurring in the intake system based on the fact that the diagnostic value JDR is larger than the threshold value β.

When the diagnostic value JDR is larger than the threshold value (S510: YES), the electronic control unit 50 determines that the leakage abnormality is present (S430), sets the determination completion flag FH to "ON" (S450), and temporarily ends the processing.

When the diagnostic value JDR is equal to or less than the threshold value β (S510: NO), the electronic control unit 50 determines that the leakage abnormality is not present (S440), sets the determination completion flag FH to "ON" (S450), and temporarily ends the processing.

In such a modification, the leakage abnormality can appropriately be determined based on the deviation degree between the supercharging region monitoring value TC and the non-supercharging region monitoring value NA. •As the deviation degree between the supercharging region monitoring value TC and the non-supercharging region monitoring value NA increases, the value of the supercharging region monitoring value TC becomes larger, while the value of the non-supercharging region monitoring value NA becomes smaller. Accordingly, when the supercharging region monitoring value TC is larger than a first preset specified value and the non-supercharging region monitoring value NA is smaller than a second specified value which is preset to be smaller than the first specified value, the presence of leakage abnormality in the intake system may be determined. Such a modification can be implemented by executing the processing of step S600 illustrated in FIG. 7 in place of the processing of steps S410 and S420 illustrated in FIG. 5.

As illustrated in FIG. 7, in this modification, when it is determined that the aforementioned execution conditions of the abnormality determination are satisfied in step S400 illustrated in FIG. 5 (S400: YES), the electronic control unit 50 determines whether or not the supercharging region monitoring value TC is larger than a threshold value H3 and the non-supercharging region monitoring value NA is smaller than a threshold value H4 (S600). The threshold value H3 corresponds to the first specified value. The threshold value H4 is smaller than the threshold value H3 and corresponds to the second specified value. The threshold value H3 and the threshold value H4 are preset values that make it possible to determine that the deviation degree between the supercharging region monitoring value TC and the non-supercharging region monitoring value NA is large enough to determine that leakage abnormality is occurring in the intake system presets, based on the fact that the supercharging region monitoring value TC is larger than the threshold value H3 and the non-supercharging region monitoring value NA is smaller than the threshold value H4.

When the supercharging region monitoring value TC is larger than the threshold value H3 and the non-supercharging region monitoring value NA is smaller than the threshold value H4 (S600: YES), the electronic control unit 50 determines that leakage abnormality is present (S430), sets the determination completion flag FH to "ON" (S450), and temporarily ends the processing.

When negative determination is made in step S600 (S600: NO), the electronic control unit 50 determines that the leakage abnormality is not present (S440), sets the determination completion flag FH to "ON" (S450), and temporarily ends the processing.

In such a modification, the leakage abnormality can still appropriately be determined based on the deviation degree between the supercharging region monitoring value TC and the non-supercharging region monitoring value NA. •The supercharging region monitoring value TC and the non-supercharging region monitoring value NA are each an average value of the plurality of the basic parameters BP calculated during a period of time until the counter value becomes a specified determination value or more in the state where the monitoring conditions are satisfied. Instead of the average value, a maximum value or a minimum value among the plurality of the basic parameters BP calculated during such a period may be set as the supercharging region monitoring value TC or the non-supercharging region monitoring value NA. Moreover, if an instantaneous value of the basic parameter BP, when the intake air amount is sufficiently stable and the monitoring conditions are satisfied, becomes generally the same as the above-stated average value, maximum value, or minimum value of the basic parameter BP, the instantaneous value of the basic parameter BP when the monitoring conditions are satisfied may be set as the supercharging region monitoring value TC or the non-supercharging region monitoring value NA.

•Conventionally, the presence or absence of leakage abnormality is diagnosed by comparing the detection value of a sensor with a reference value in normal condition. In such a conventional case where the detection value of such a sensor is the intake pressure downstream from the throttle valve, it is desirable for leakage abnormality diagnosis with sufficient accuracy to diagnose the leakage abnormality during idle operation because of the following reason. That is, during idle operation, the opening of the throttle valve while the engine is in operation is smaller than that in other engine operation states. Accordingly, the intake pressure is considerably lower than that in other engine operation states. Accordingly, a difference between the detection value of the sensor when the leakage abnormality is occurring and the reference value in normal condition becomes more notable during idle operation that in other engine operation states.

Meanwhile, engines with an idling stop function are put in practical use in recent years. When engine operation shifts to idle operation, such engines automatically stop. As a consequence, during idle operation, it is difficult to diagnose the leakage abnormality based on the difference between the detection value of the sensor and the reference value in normal condition, which makes it difficult to perform accurate diagnoses of the leakage abnormality.

In this point, the abnormality diagnosis devices for an intake system according to the embodiment and modifications thereof can accurately diagnose the leakage abnormality in the intake system during operation of the engine even in engine operation states other than the idle operation. Accordingly, if the abnormality diagnosis devices for an intake system according to the embodiment and modifications thereof are applied to the engines with the idling stop function, it becomes possible to accurately diagnose the leakage abnormality in the intake system in such engines.

An abnormality diagnosis device for an intake system of an internal combustion engine according to a first aspect is applied to an internal combustion engine having an intake system equipped with a supercharger that pumps air to diagnose leakage abnormality in the intake system downstream from the supercharger. The internal combustion engine includes an air flowmeter provided upstream from the supercharger in the intake system, a throttle valve provided downstream from the supercharger in the intake system, and an intake pressure sensor provided downstream from the throttle valve in the intake system. The abnormality diagnosis device for an intake system includes: a first air amount calculation unit that calculates a first air amount that is an intake air amount obtained from a detection value of the air flowmeter; a second air amount calculation unit that calculates the second air amount that is an intake air amount obtained from a detection value of the intake pressure sensor; a ratio calculation unit that calculates a ratio of the first air amount to the second air amount; a supercharging region determination unit that determines whether or not the internal combustion engine is driven in a supercharging region; a first setting unit that sets, as a supercharging region monitoring value, the ratio obtained when the supercharging region determination unit determines that the internal combustion engine is driven in the supercharging region; a second setting unit that sets, as a non-supercharging region monitoring value, the ratio obtained when the supercharging region determination unit determines that the internal combustion engine is driven in a non-supercharging region; and an abnormality determination unit that determines the presence or absence of the leakage abnormality based on a deviation degree between the supercharging region monitoring value and the non-supercharging region monitoring value.

In the normal condition where leakage abnormality does not occur in the intake system, the first air amount obtained from the detection value of the air flowmeter and the second air amount obtained from the detection value of the intake pressure sensor become generally identical except for measurement errors, and do not deviate from each other. Accordingly, a ratio of the first air amount to the second air amount becomes approximately "1." The ratio of the first air amount to the second air amount is a value represented by "A/B" where "A" is the first air amount and "B" is the second air amount.

In the case of the combustion engine including a supercharger, the first air amount and the second air amount are different from each other when the leakage abnormality as describe before occurs in the intake system downstream from the supercharger.

That is, when the combustion engine is driven in the supercharging region, the pressure in the intake system downstream from the supercharger becomes higher than the atmospheric pressure. Accordingly, air leaks to the outside of the intake system from a location where leakage abnormality is occurring. Accordingly, the second air amount becomes less than the first air amount, and the ratio of the first air amount to the second air amount becomes larger than "1".

Meanwhile, when the combustion engine is driven in the non-supercharging region (natural intake region), the pressure in the intake system downstream from the supercharger becomes lower than the atmospheric pressure. As a result, air is sucked into the intake system from the location where the leakage abnormality is occurring. Accordingly, the second air amount becomes larger than the first air amount, and the ratio of the first air amount to the second air amount becomes smaller than "1".

Thus, in the combustion engine including the supercharger, when leakage abnormality occurs in the intake system downstream from the supercharger, the ratio in the supercharging region becomes larger than the ratio in the normal condition, while the ratio in the non-supercharging region becomes smaller than the ratio in the normal condition. As a result, the deviation degree between the ratio in the supercharging region and the ratio in the non-supercharging region increases significantly. Therefore, even when the level of the leakage abnormality is relatively small, occurrence of such abnormality becomes easily reflected on the aforementioned deviation degree.

Accordingly, in this configuration, such a ratio in the supercharging region is set as a supercharging region monitoring value, while the ratio in the non-supercharging region is set as a non-supercharging region monitoring value. Since the presence or absence of the leakage abnormality is determined based on the deviation degree between the supercharging region monitoring value and the non-supercharging region monitoring value, it becomes possible to more accurately diagnose the leakage abnormality.

It is preferable that the abnormality determination unit in the abnormality diagnosis device calculates, as a value indicative of the deviation degree, a ratio of the supercharging region monitoring value to the non-supercharging region monitoring value, and determines the presence of the leakage abnormality when the calculated ratio is larger than a preset specified value. The ratio of the supercharging region monitoring value to the non-supercharging region monitoring value is a value expressed by "C/D", where "C" is the supercharging region monitoring value and "D" is the non-supercharging region monitoring value.

According to the configuration, as the deviation degree between the supercharging region monitoring value and the non-supercharging region monitoring value increases, the ratio of the supercharging region monitoring value to the non-supercharging region monitoring value becomes larger. Accordingly, determining the presence of the leakage abnormality when the ratio is larger than a preset specified value makes it possible to appropriately determine the leakage abnormality based on the deviation degree.

Moreover, expressing the deviation degree as a ratio of the supercharging region monitoring value to the non-supercharging region monitoring value makes it possible to suppress the influence of detection errors of the air flowmeter and the intake pressure sensor on the deviation degree. That is, the detection error of the air flowmeter is defined as ±EA %, and the detection error of the intake pressure sensor is defined as ±EB %. An actual amount of air that passes a portion provided with the air flowmeter in the supercharging region is defined as A1. An actual amount of air that passes a portion provided with the intake pressure sensor in the supercharging region is defined as B1. An actual amount of air that passes a portion provided with the air flowmeter in the non-supercharging region is defined as A2. An actual amount of air that passes a portion provided with the intake pressure sensor in the non-supercharging region is defined as B1.

In this case, the first air amount obtained from a detection value of the air flowmeter in the supercharging region can be expressed as $[A1\times(1\pm EA\times0.01)]$. The second air amount obtained from a detection value of the intake pressure sensor in the supercharging region can be expressed as $[B1\times(1\pm EB\times0.01)]$. The first air amount obtained from a detection value of the air flowmeter in the non-supercharging region can be expressed as $[A2\times(1\pm EA\times0.01)]$. The second air amount obtained from a detection value of the intake pressure sensor in the non-supercharging region can be expressed as $[B2\times(1\pm EB\times0.01)]$. Therefore, the supercharging region monitoring value becomes $[\{A1\times(1\pm EA\times0.00\}/\{B1\times(1\pm EB\times0.01)\}]$, and the non-supercharging region monitoring value becomes $[\{A2\times(1\pm EA\times0.01)\}/\{B2\times(1\pm EB\times0.01)\}]$. In this case, a ratio of the supercharging region monitoring value to the non-supercharging region monitoring value is calculated by multiplying the supercharging region monitoring value by a reciprocal of the non-supercharging region monitoring value. Accordingly, a term $[(1\pm EA\times0.01)/(1\pm EB\times0.01)]$ included in the supercharging region monitoring value and a term $[(1\pm EA\times0.01)/(1\pm EB\times0.01)]$ included in the non-supercharging region monitoring value cancel each other to be "1". Therefore, the detection errors of the air flowmeter and the intake pressure sensor are no longer included in the ratio of the supercharging region monitoring value to the non-supercharging region monitoring value, so that the influence of such a detection error on the ratio is suppressed. As a result, the influence of detection errors on the accuracy of abnormality diagnosis can be suppressed.

What is claimed is:

1. An abnormality diagnosis device applied to an internal combustion engine having an intake system equipped with a supercharger that pumps air to diagnose leakage abnormality in the intake system downstream from the supercharger, the internal combustion engine including an air flowmeter provided upstream from the supercharger in the intake system, a throttle valve provided downstream from the supercharger in the intake system, and an intake pressure sensor provided downstream from the throttle valve in the intake system, the abnormality diagnosis device comprising:
a first air amount calculation unit configured to calculate a first air amount that is an intake air amount obtained from a detection value of the air flowmeter;
a second air amount calculation unit configured to calculate a second air amount that is an intake air amount obtained from a detection value of the intake pressure sensor;
a ratio calculation unit configured to calculate a ratio of the first air amount to the second air amount;
a supercharging region determination unit configured to determine whether or not the internal combustion engine is driven in a supercharging region;
a first setting unit configured to set, as a supercharging region monitoring value, the ratio obtained when the supercharging region determination unit determines that the internal combustion engine is driven in the supercharging region;
a second setting unit configured to set, as a non-supercharging region monitoring value, the ratio obtained when the supercharging region determination unit determines that the internal combustion engine is driven in a non-supercharging region; and
an abnormality determination unit configured to determine presence or absence of the leakage abnormality based on a deviation degree between the supercharging region monitoring value and the non-supercharging region monitoring value.

2. The abnormality diagnosis device according to claim 1, wherein
the abnormality determination unit calculates, as a value indicative of the deviation degree, a ratio of the supercharging region monitoring value to the non-supercharging region monitoring value, and determines the presence of the leakage abnormality when the calculated ratio is larger than a preset specified value.

3. The abnormality diagnosis device according to claim 1, wherein
the abnormality determination unit calculates, as a value indicative of the deviation degree, a difference between the supercharging region monitoring value and the non-supercharging region monitoring value, and determines the presence of the leakage abnormality when the calculated difference is larger than a preset specified value.

4. The abnormality diagnosis device according to claim 1, wherein
the abnormality determination unit determines the presence of the leakage abnormality when the supercharging region monitoring value is larger than a preset first threshold, and the non-supercharging region monitoring value is smaller than a preset second threshold.

5. An abnormality diagnosis method applied to an internal combustion engine having an intake system equipped with a supercharger that pumps air, to diagnose leakage abnormality in the intake system downstream from the supercharger, the internal combustion engine including an air flowmeter provided upstream from the supercharger in the intake system, a throttle valve provided downstream from the supercharger in the intake system, and an intake pressure sensor provided downstream from the throttle valve in the intake system, the abnormality diagnosis method comprising:
calculating a first air amount that is an intake air amount obtained from a detection value of the air flowmeter;
calculating a second air amount that is an intake air amount obtained from a detection value of the intake pressure sensor;
calculating a ratio of the first air amount to the second air amount;
setting, as a supercharging region monitoring value, the ratio obtained when the internal combustion engine is driven in the supercharging region;
setting, as a non-supercharging region monitoring value, the ratio obtained when the internal combustion engine is driven in a non-supercharging region; and
determining presence or absence of the leakage abnormality based on a deviation degree between the supercharging region monitoring value and the non-supercharging region monitoring value.

* * * * *